(12) United States Patent　　　(10) Patent No.: US 12,563,491 B2

Yu et al.　　　(45) Date of Patent:　　　Feb. 24, 2026

(54) CHANNEL ACCESS MECHANISM FOR LOW POWER WAKE-UP RECEIVERS

(71) Applicant: NEWRACOM, Inc., Irvine, CA (US)

(72) Inventors: Heejung Yu, Daejeon (KR); Duk Bai Kim, Irvine, CA (US)

(73) Assignee: NEWRACOM, Inc., Irvine, CA (US)

( * ) Notice: Subject to any disclaimer, the term of this patent is extended or adjusted under 35 U.S.C. 154(b) by 385 days.

(21) Appl. No.: 18/168,499

(22) Filed: Feb. 13, 2023

(65) Prior Publication Data

US 2023/0300744 A1　　　Sep. 21, 2023

Related U.S. Application Data

(60) Provisional application No. 63/269,573, filed on Mar. 18, 2022.

(51) Int. Cl.
H04W 52/02　　　(2009.01)

(52) U.S. Cl.
CPC ... H04W 52/0216 (2013.01); H04W 52/0229 (2013.01)

(58) Field of Classification Search
CPC ......... H04W 52/0216; H04W 52/0229; H04W 84/12
See application file for complete search history.

(56) References Cited

U.S. PATENT DOCUMENTS

| | | | | |
|---|---|---|---|---|
| 11,172,448 B2 * | 11/2021 | Hwang | ................ | H04W 28/04 |
| 2015/0181620 A1 * | 6/2015 | Seok | ................ | H04W 74/0816 |
| | | | | 370/336 |
| 2019/0253972 A1 * | 8/2019 | Park | ................ | H04W 52/0235 |
| 2019/0349926 A1 * | 11/2019 | Alanen | ................ | H04W 92/20 |

OTHER PUBLICATIONS

IEEE 802.11-2016, "Part 11: Wireless LAN Medium Access Control (MAC) and Physical Layer (PHY) Specifications," Standard, Institute of Electrical and Electronics Engineers, Inc. (IEEE), Dec. 7, 2016, 3534 pages.
IEEE 802.11b-1999: "Higher Speed Physical Layer (PHY) Extension in the 2.4 GHz Band," IIEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.

(Continued)

*Primary Examiner* — Marcos L Torres
(74) *Attorney, Agent, or Firm* — Nicholson, De Vos, Webster & Elliott, LLP

(57)　　　ABSTRACT

A method performed by a wireless device operating as an access point in a wireless network to allocate a restricted access window (RAW) for wake-up receiver stations. The method includes generating a beacon frame, wherein the beacon frame includes information regarding a RAW that is allocated for one or more wake-up receiver stations, wherein each of the one or more wake-up receiver stations includes a main radio and a wake-up receiver and wirelessly transmitting the beacon frame.

17 Claims, 15 Drawing Sheets

(56) References Cited

OTHER PUBLICATIONS

IEEE P802.11ax/D8.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 1: Enhancements for High Efficiency WLAN, Oct. 2020, 820 pages.

IEEE P802.11be/D1.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 8: Enhancements for extremely high throughput (EHT), May 2021, 635 pages.

IEEE Std 802.11a-1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE Std 802.11ah-2016, "Part 11: Wireless LAN Medium Access Control (MAC) and Physical Layer (PHY) Specifications, Amendment 2: Sub 1 GHz License Exempt Operation", IEEE Standard for Information technology—Telecommunications and information exchange between systems, Local and metropolitan area networks—Specific requirements, Dec. 7, 2016, 594 pages.

IEEE Std 802.11g-2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.

IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.

IEEE Std 802.11p-2010 Part 11: Wireless LAN Medium Access Control (MAC) and Physical Layer (PHY) Specifications, Amendment 6: Wireless Access in Vehicular Environments, IEEE Standard for Information technology—Telecommunications and information exchange between systems, Local and metropolitan area networks—Specific requirements, Jul. 15, 2010, 51 pages.

IEEE Std P802.11bd/D1.1, Part 11: Wireless LAN Medium Access Control (MAC) and Physical Layer (PHY) Specifications, Amendment 5: Enhancements for Next Generation Vehicular Communication, IEEE Draft Standard for Information technology—Telecommunications and information exchange between systems, Local and metropolitan area networks—Specific requirements, Dec. 2020, 102 pages.

* cited by examiner

| | |
|---|---|
| Frequency Band | License-exempt bands below 1 GHz, excluding the TV white spaces |
| Channel Width | 1/2/4/8/16 MHz |
| Modulation Schemes | BPSK, QPSK, 16-QAM, 64-QAM, 256-QAM |
| Maximum Number of Spatial Streams | Four spatial streams |
| Range | Up to 1Km (outdoor) |
| End Node Transmit Power | Dependent on regional regulations (from 1 mW to 1 W) |
| Packet Size | Up to 7,991 bytes (without aggregation) up to 65,535 bytes (with aggregation) |
| Data Rate | 150 kb/s (1 MHz channel bandwidth, 1 spatial stream, BPSK, 1/2 coding rate, repetition coding) to 347 Mb/s (16 MHz channel bandwidth, 4 spatial streams, 256 QAM, 5/6 coding rate) |
| Number of Stations | Up to 6000 |
| Location | Indoor and outdoor |
| Traffic Type | Periodic packet transmission every few to tens minutes |

FIG. 6

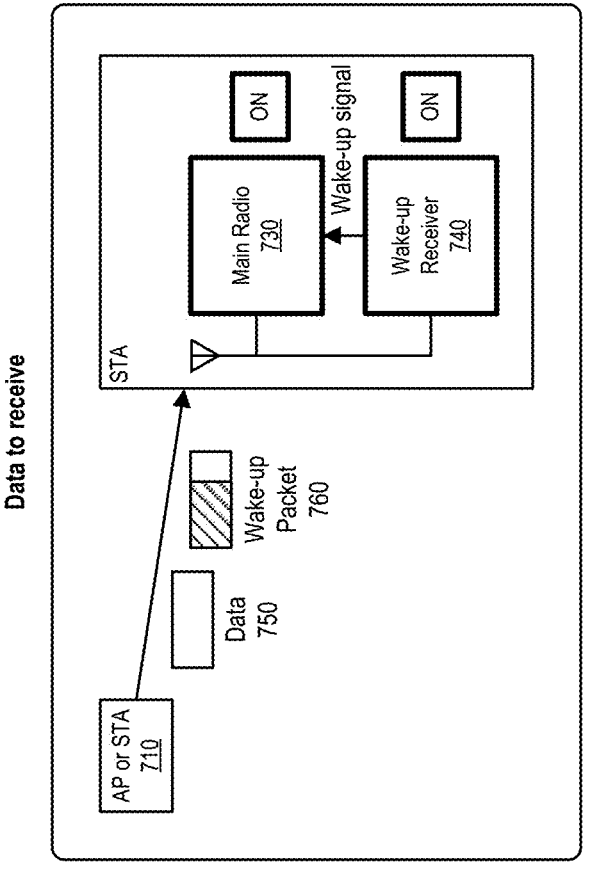
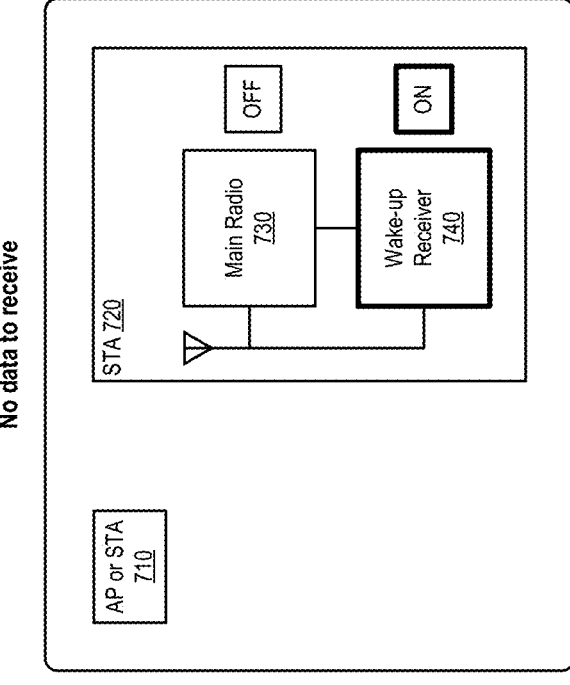
FIG. 7

S1G1_SHORT PPDU format

S1G1_LONG PPDU format

S1G1_1M PPDU format

2 MHz

STF 1102 | LTF1 1104 | SIG 1106 | WUR-Preamble 1108 | WUR-Data 1110 | < 2 MHz

WUP frame format corresponding to S1G1_SHORT PPDU format

2 MHz

STF 1202 | LTF1 1204 | SIG-A 1206 | WUR-Preamble 1208 | WUR-Data 1210 | < 2 MHz

WUP frame format corresponding to S1G1_LONG PPDU format

1 MHz

STF 1302 | LTF1 1304 | SIG 1306 | WUR-Preamble 1308 | WUR-Data 1310 | < 1 MHz

WUP frame format corresponding to S1G1_1M PPDU format

WUR-Preamble 1402 | WUR-Data 1404 | < 1 or 2 MHz

Green-field WUP frame format

| RAW Type | Description | Raw Type Options |
|---|---|---|
| 0 | Generic RAW | Bit 0 (Bit 2 of RAW Control subfield): Paged STA<br>Bit 1 (Bit 3 of RAW Control subfield): RA frame |
| 1 | Sounding RAW | 0: SST sounding RAW<br>1: SST report RAW<br>2: Sector sounding RAW<br>3: Sector report RAW |
| 2 | Simplex RAW | 0: AP PM RAW<br>1: Non-TIM RAW<br>2: Omni RAW<br>3: Reserved |
| 3 | Triggering frame RAW | Reserved |

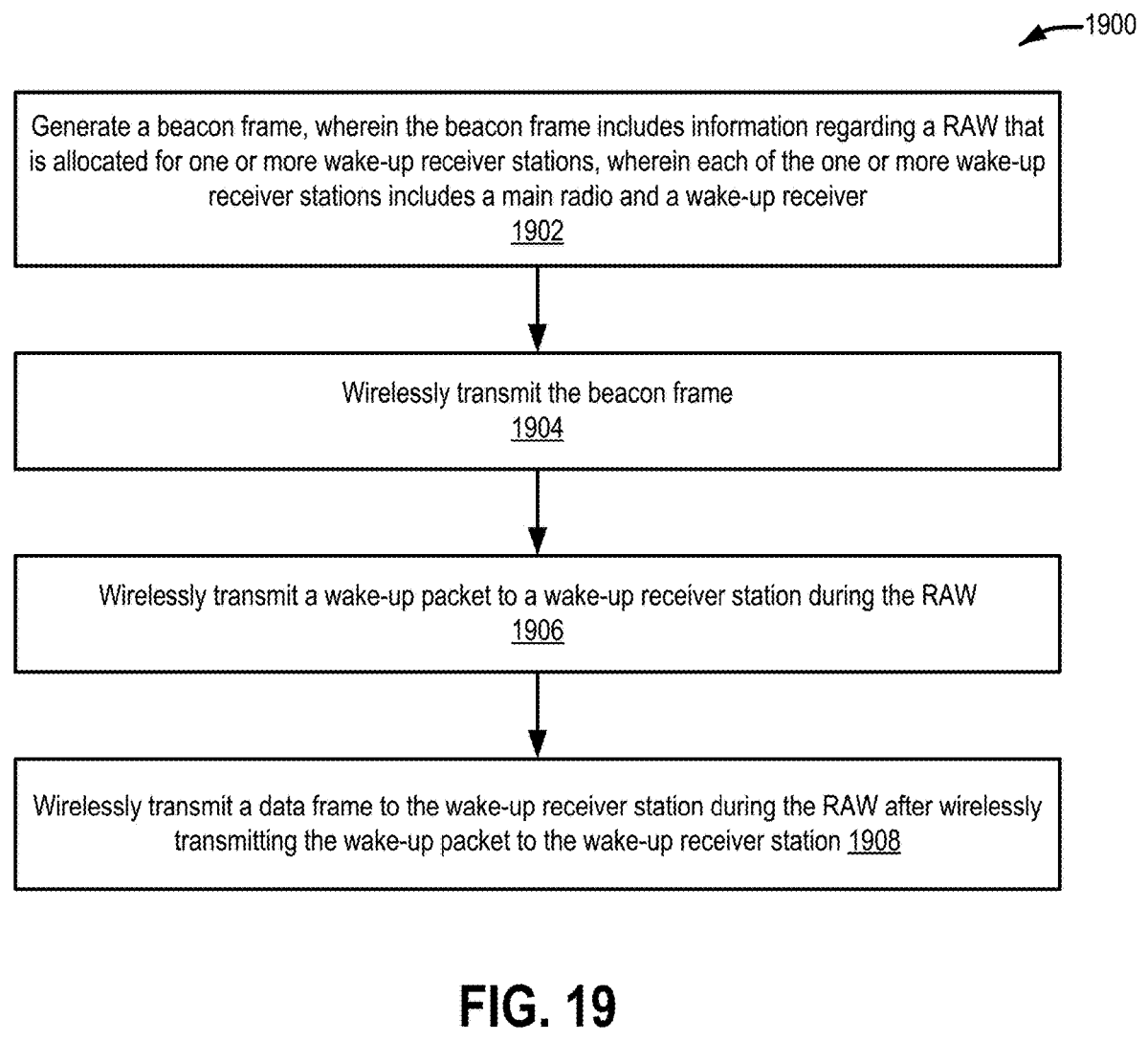

Generate a beacon frame, wherein the beacon frame includes information regarding a RAW that is allocated for one or more wake-up receiver stations, wherein each of the one or more wake-up receiver stations includes a main radio and a wake-up receiver
1902

Wirelessly transmit the beacon frame
1904

Wirelessly transmit a wake-up packet to a wake-up receiver station during the RAW
1906

Wirelessly transmit a data frame to the wake-up receiver station during the RAW after wirelessly transmitting the wake-up packet to the wake-up receiver station 1908

FIG. 19

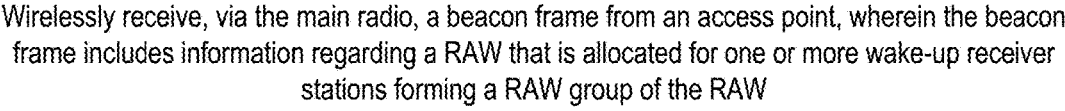

—2000

Wirelessly receive, via the main radio, a beacon frame from an access point, wherein the beacon frame includes information regarding a RAW that is allocated for one or more wake-up receiver stations forming a RAW group of the RAW
2002

Responsive to determining that the wake-up receiver station is part of the RAW group, transition from being in a deep sleep mode to being in a normal sleep mode when the RAW begins, wherein when the wake-up receiver station is in the deep sleep mode, both the main radio and the wake-up receiver are turned off, wherein when the wake-up receiver station is in the normal sleep mode, the main radio is turned off but the wake-up receiver is turned on
2004

Wirelessly receive, via the wake-up receiver, a wake-up packet from the access point during the RAW
2006

Responsive to wirelessly receiving the wake-up packet, transitioning from being in the normal sleep mode to being in an active mode, wherein when the wake-up receiver station is in the active mode, the main radio is turned on 2008

Wirelessly receive, via the main radio, a data frame from the access point during the RAW after wirelessly receiving the wake-up packet from the access point 2010

FIG. 20

CHANNEL ACCESS MECHANISM FOR LOW POWER WAKE-UP RECEIVERS

CROSS-REFERENCE TO RELATED APPLICATION

This application claims the benefit of U.S. Provisional Application No. 63/269,573, filed Mar. 18, 2022, which is hereby incorporated by reference.

TECHNICAL FIELD

The present disclosure generally relates to wireless communications, and more specifically, relates to allocating a restricted access window (RAW) for wake-up receiver stations.

BACKGROUND

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 Gigahertz (GHz) as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 Megahertz (MHz) apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

The IEEE 802.11ah Task Group has developed an amendment to the 802.11 standard targeting the Internet of Things (IoT) application and extended range (ER) applications by defining sub-1-GHz (S1G) license-exempt operation. IoT is considered the next major growth area for the wireless industry of home appliances and industrial automation, asset tracking, healthcare, energy management, and wearable devices. IoT devices are typically powered by a small battery and require low power consumption.

The concept of a low-power wake-up receiver has been discussed in the standardization efforts of IEEE 802.11. In this concept, the communications subsystems include a main radio (e.g., IEEE 802.11ah radio) and a low-power wake-up receiver (also referred to as a "wake-up receiver," "WUR," or "LP-WUR"). The main radio is used for user data transmission and reception. The main radio is turned off unless there is data for it to transmit or receive. The wake-up receiver "wakes up" the main radio if it receives a wake-up signal from an AP and there is data for the main radio to receive. Once the wake-up receiver wakes up the main radio, user data is transmitted and received by the main radio. The wake-up receiver is not used for user data transmission/reception in general but serves to wake up the main radio. The wake-up receiver may be active while the main radio is turned off. The wake-up receiver may operate in the sub-1 GHz band (instead of the 2.4 GHz and 5 GHz bands). The design of the wake-up receiver may be simple such that its target power consumption is much lower than that of the main radio (e.g., the target power consumption may be less than 100 uW when active). To achieve this goal, the wake-up receiver may use simple modulation schemes such as on-off keying (OOK) with repetition (or spreading) schemes instead of complicated modulation schemes that require coherent detection and channel coding schemes.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows a table listing various characteristics of 802.11ah, according to some embodiments.

FIG. 7 is a diagram showing operational examples of a low-power wake-up receiver when there is data to receive and when there is no data to receive, according to some embodiments.

FIG. 18 is a diagram showing a table of an interpretation of the RAW type field and the RAW type options field in IEEE 802.11ah, according to some embodiments.

FIG. 19 is a diagram showing a method for allocating a RAW for wake-up receiver stations, according to some embodiments.

FIG. 20 is a diagram showing a method for performing RAW operations, according to some embodiments.

DETAILED DESCRIPTION

Figure 1:
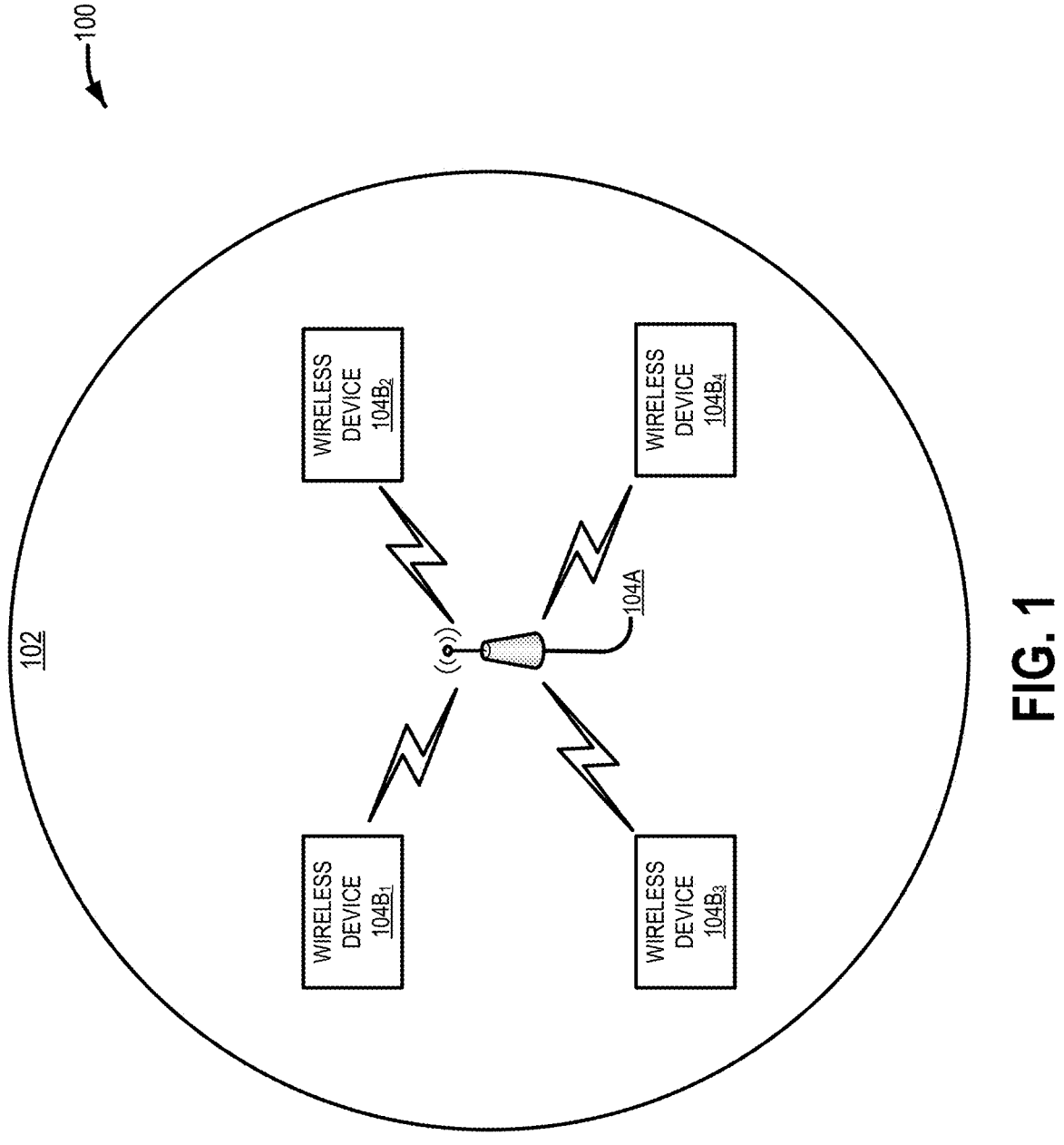
FIG. 1 illustrates an example wireless local area network (WLAN) with a basic service set (BSS) that includes a plurality of wireless devices, according to some embodiments.

The present disclosure generally relates to wireless communications, and more specifically, relates to allocating a restricted access window (RAW) for wake-up receiver stations. Embodiments disclosed herein provide a mechanism to allocate a RAW that is specifically for wake-up receiver stations (stations that have wake-up receiver functionality). Only wake-up receiver stations may be allowed to transmit data during this RAW. Stations that do not have wake-up receiver functionality (legacy stations) are not allowed to transmit during this RAW. Allocating a RAW that is for wake-up receiver stations may help protect the transmissions of low-power wake-up packets (WUPs) from interference by legacy frames. Also, as will be further described herein, the RAW mechanism disclosed herein may allow for a more efficient green-field WUP frame format to be used during the RAW to "wake up" the wake-up receiver stations. Also, as will be further described herein, the RAW mechanism disclosed herein may allow for wake-up receiver stations to use two sleep mode stages, namely a normal sleep mode and a deep sleep mode. In the normal sleep mode, the wake-up receiver station's main radio may be turned off but the wake-up receiver station's wake-up receiver may be turned on. In the deep sleep mode, both the wake-up receiver station's main radio and wake-up receiver may be turned off to conserve even more power. The wake-up receiver may be in a normal sleep mode during the RAW (so that it is able to receive WUPs) but be in a deep sleep mode during RAWs allocated for legacy stations to conserve power (since there is no possibility of receiving a WUP during these RAWs). The present disclosure also describes several possible frame formats that can be used to protect WUPs from interference by legacy stations.

An embodiment is a method performed by a wireless device operating as an access point (AP) in a wireless network to allocate a RAW for wake-up receiver stations. The method includes generating a beacon frame, wherein the beacon frame includes information regarding a RAW that is allocated for one or more wake-up receiver stations, wherein each of the one or more wake-up receiver stations includes a main radio and a wake-up receiver. The method further includes wirelessly transmitting the beacon frame.

An embodiment is a method performed by a wireless device operating as a wake-up receiver station in a wireless network. The wake-up receiver station includes a main radio and a wake-up receiver. The method includes wirelessly receiving, via the main radio, a beacon frame from an access point, wherein the beacon frame includes information regarding a RAW that is allocated for one or more wake-up receiver stations forming a RAW group of the RAW. The method further includes transitioning from being in a deep sleep mode to being in a normal sleep mode when the RAW begins in response to determining that the wake-up receiver station is part of the RAW group.

Allocating a RAW specifically for wake-up receiver stations allows for a WUP to be transmitted in a more efficient green-field format during the RAW and allows for wake-up receiver stations to be in a deep sleep mode during RAWs allocated for legacy stations that do not have wake-up receiver functionality. This can significantly reduce the power consumption of the wake-up receiver stations, and thereby extend network operation time compared to conventional wake-up receiver operations.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices 104B$_1$-104B$_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices 104B$_1$-104B$_4$) may be collectively referred to as STAs. However, for ease of description, only the non-AP STAs may be referred to as STAs. Although shown with four non-AP STAs (e.g., the wireless devices 104B$_1$-104B$_4$), the WLAN 100 may include any number of non-AP STAs (e.g., one or more wireless devices 104B).

Figure 2:
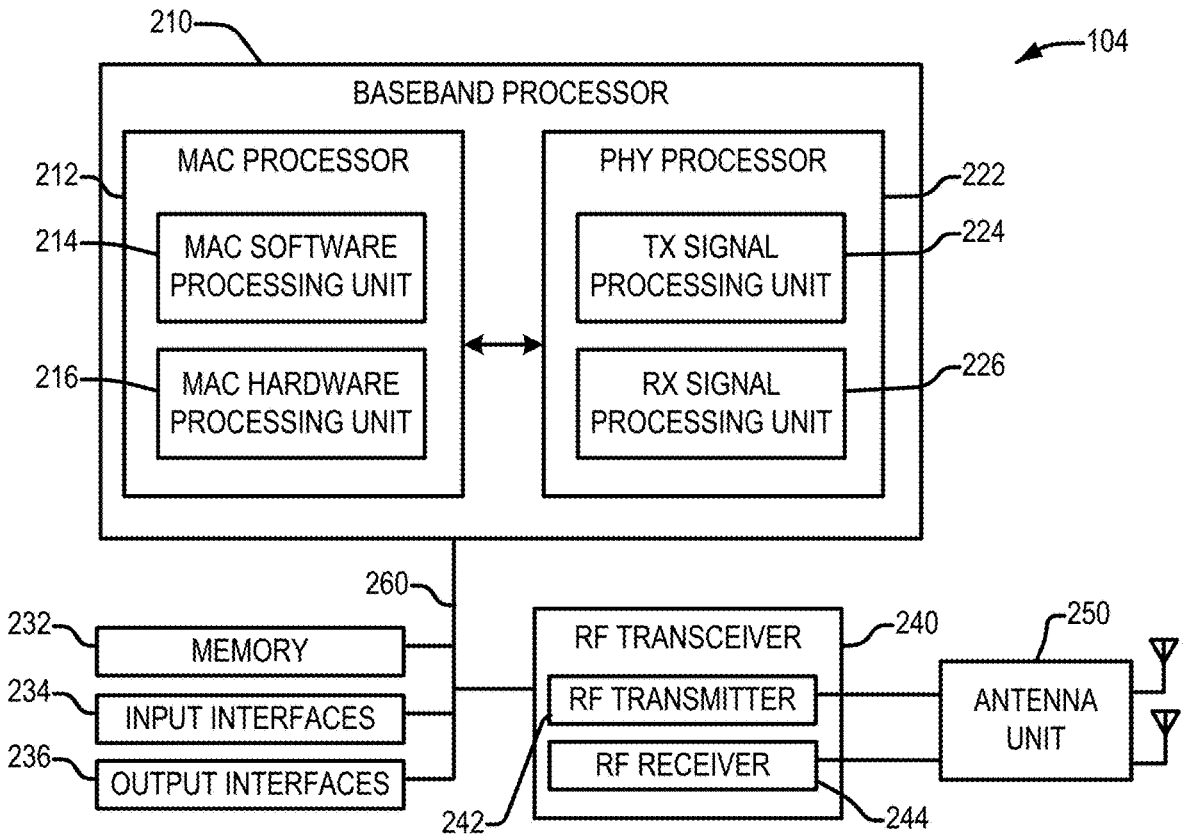
FIG. 2 is a schematic diagram of a wireless device, according to some embodiments.

FIG. 2 illustrates a schematic block diagram of a wireless device 104, according to an embodiment. The wireless device 104 may be the wireless device 104A (i.e., the AP of the WLAN 100) or any of the wireless devices 104B$_1$-104B$_4$ in FIG. 1. The wireless device 104 includes a baseband processor 210, a radio frequency (RF) transceiver 240, an antenna unit 250, a storage device (e.g., memory device) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory device 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figures 3A, 3B:
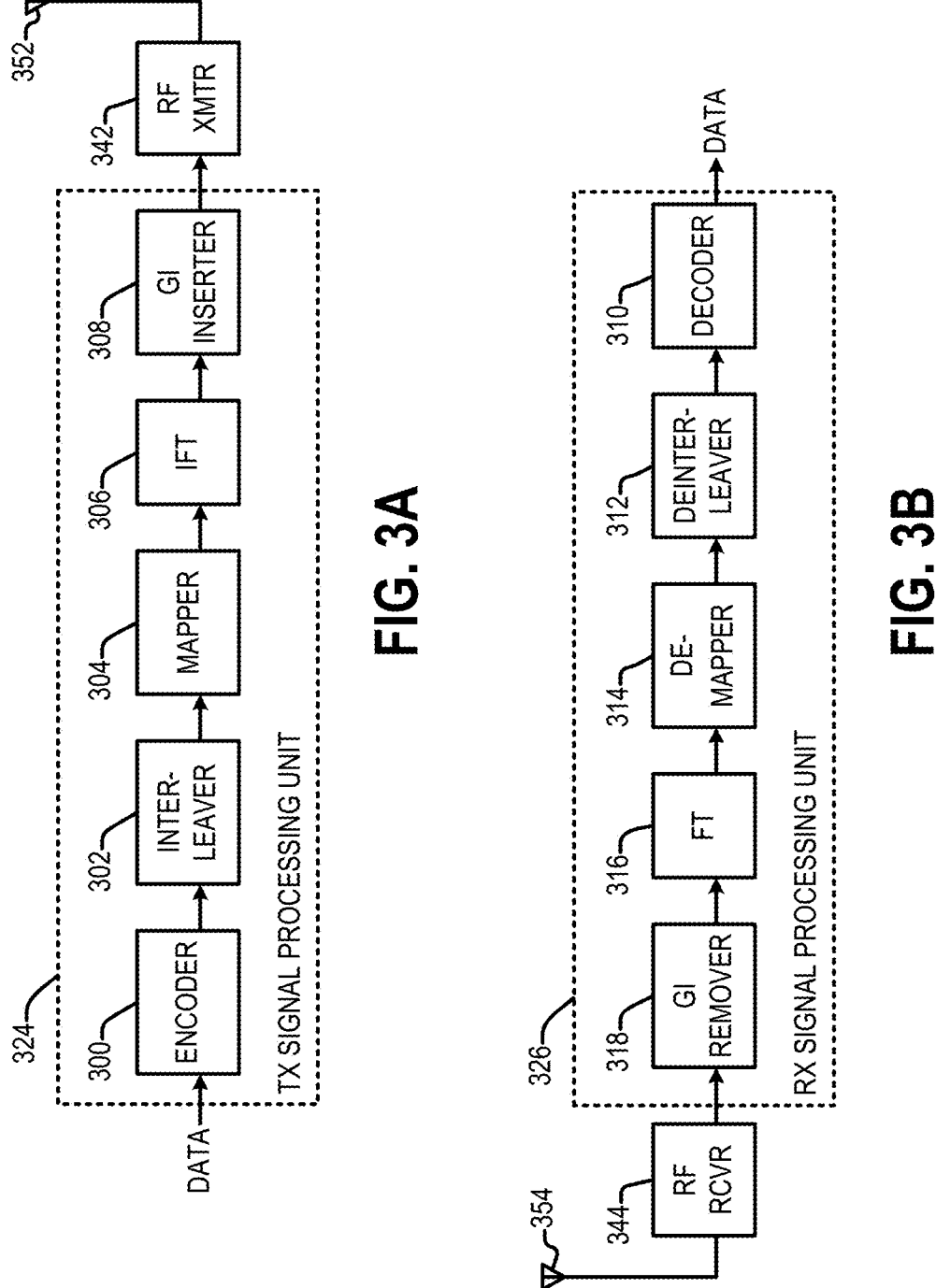
FIG. 3A illustrates components of a wireless device configured to transmit data, according to some embodiments.
FIG. 3B illustrates components of a wireless device configured to receive data, according to some embodiments.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 310 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 Megahertz (MHz), 20 MHz, 40 MHz, 80 MHz, 160 MHz, 240 MHz, and 320 MHz contiguous channel widths and support for an 80+80, 80+160 MHz, and 160+160 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
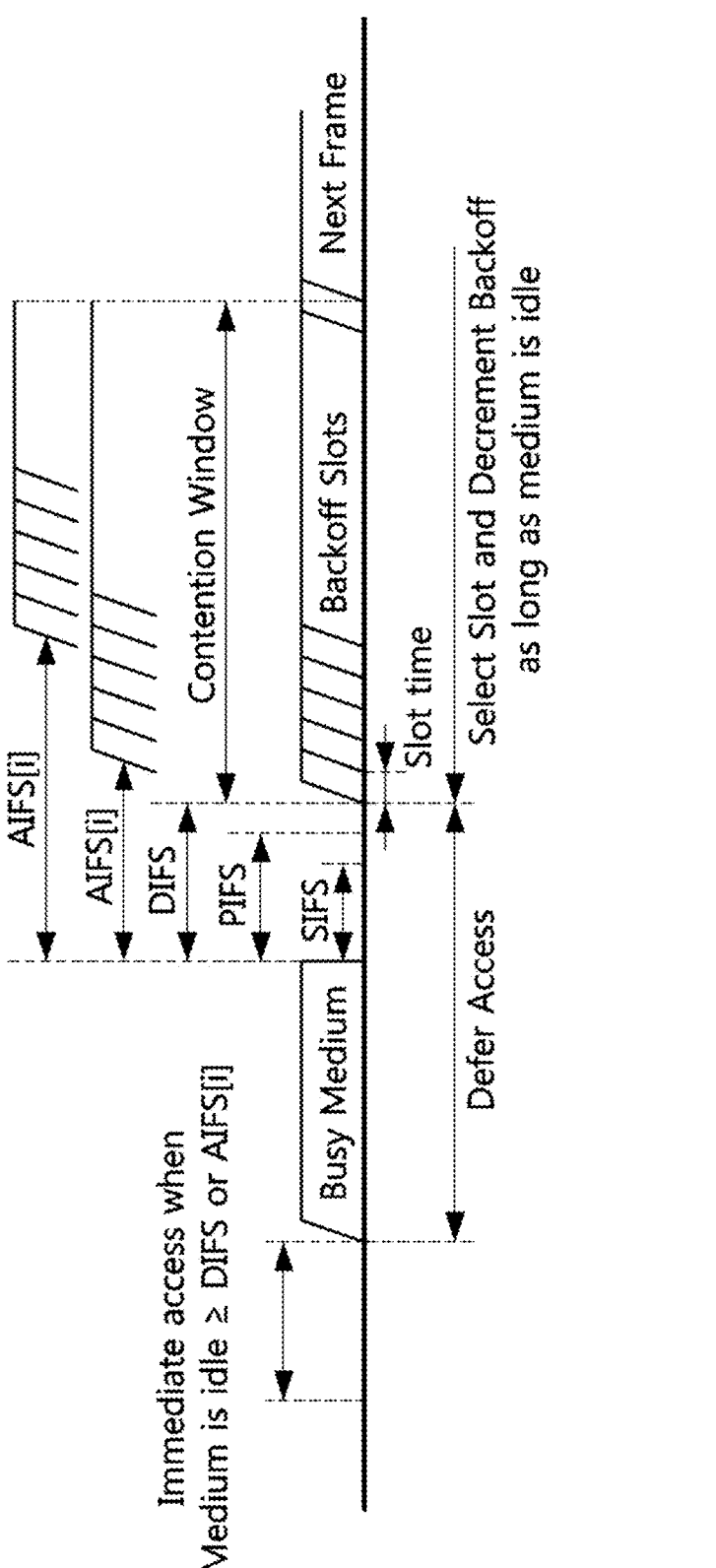
FIG. 4 illustrates Inter-Frame Space (IFS) relationships, according to some embodiments.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
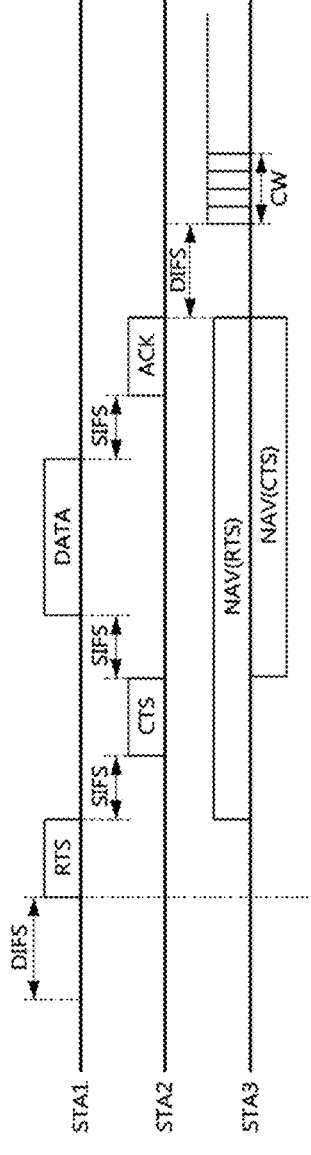
FIG. 5 illustrates a Carrier Sense Multiple Access/Collision Avoidance (CSMA/CA) based frame transmission procedure, according to some embodiments.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

As mentioned above, the IEEE 802.11ah Task Group has developed an amendment to the 802.11 standard targeting the Internet of Things (IoT) application and extended range (ER) applications by defining sub-1-GHz (S1G) license-exempt operation. IoT is considered the next major growth area for the wireless industry of home appliances and industrial automation, asset tracking, healthcare, energy management, and wearable devices. IoT devices are typically powered by a small battery and require low power consumption.

Although S1G bands have more limited frequency spectrum available than 2.4 and 5 GHz ISM bands, the basic assumption is it would be sufficient enough for low data rate applications such as IoT applications. IoT applications typically transmit small amounts of data infrequently. Moreover, since the 915 MHz ISM band (902-928 MHz) has 8.5 dB less free space propagation loss than 2.4 GHz ISM band, this could allow to enhance either the link budget between devices or long-range transmission for outdoor circumstances. Those properties can help reduce energy consumption of a device by lowering transmit power as well.

FIG. 6 shows a table listing various characteristics of 802.11ah, according to some embodiments. Even though the IEEE 802.11ah standard provides power saving features for IoT networks, some application areas such as sensor networks require ultra-low power operation to further extend network lifetime (operation time). In order to support ultra-low power operation, an addition transmission scheme, which consumes with very low power, can be employed in addition to the standard IEEE 802.11ah transmission scheme. One such transmission scheme is an on-off keying (OOK) scheme with narrow bandwidth. An OOK signal can be demodulated with non-coherent detection with simple timing synchronization. Instead of using a complicated channel coding approach, a repetition (or spreading) scheme can be used to obtain the same communication range as the lowest modulation and coding scheme (MCS) of IEEE 802.11ah. The concept of a low-power wake-up receiver has been discussed in the standardization efforts of IEEE 802.11. In this concept, the communications subsystems include a main radio (e.g., IEEE 802.11ah) and a low-power wake-up receiver (also referred to simply as a "wake-up receiver" or "WUR"). The wake-up receiver may operate in the sub-1 GHz band (instead of the 2.4 GHz and 5 GHz bands).

In this concept, the main radio (e.g., IEEE 802.11ah) is used for user data transmission and reception. The main radio is turned off unless there is data for it to transmit or receive. The wake-up receiver wakes up the main radio if it receives a wake-up signal from an AP and there is data for the main radio to receive. Once the wake-up receiver wakes up the main radio, user data is transmitted and received by the main radio. The wake-up receiver is not used for user data transmission/reception in general but serves as a "wake-up" receiver for the main radio. For this purpose, the wake-up receiver may be a relatively simple receiver. Also, the wake-up receiver may be active while the main radio is turned off. The design of the wake-up receiver may be simple such that its target power consumption is much lower than that of the main radio (e.g., the target power consumption may be less than 100 uW when active). To achieve this goal, the wake-up receiver may use simple modulation schemes such as OOK with repetition (or spreading) schemes instead of complicated modulation schemes that require coherent detection and channel coding schemes.

FIG. 7 is a diagram showing operational examples of a low-power wake-up receiver when there is data to receive and when there is no data to receive, according to some embodiments. As shown in the diagram, when there is no data to receive, the wake-up receiver 740 of the STA 720 is active (it is turned "ON") while the main radio 730 (e.g., an 802.11ah radio) of the STA 720 is turned off (it is turned "OFF") or in a low-power state. This is an example where the STA 720 is in a power-save mode to reduce power consumption. However, when the AP 710 has data 750 to transmit to the STA 720, the AP may first transmit a wake-up signal in the form of a wake-up packet (WUP) 760 which is transmitted using a new waveform such as OOK. The wake-up receiver 740 of the STA 720 may receive this wake-up packet 760. Responsive to receiving this wake-up packet 760, the wake-up receiver 740 of the STA 720 may wake up the main radio 730 of the STA 720 (turn the main radio 730 on) so that the main radio 730 becomes active. After the main radio 730 of the STA is active, the AP may transmit data 750 to the STA (e.g., using 802.11ah), which is received by the main radio 730 of the STA 720. The STA 720 is said to be in an active mode when its main radio 730 is active.

Figures 8, 9, 10:
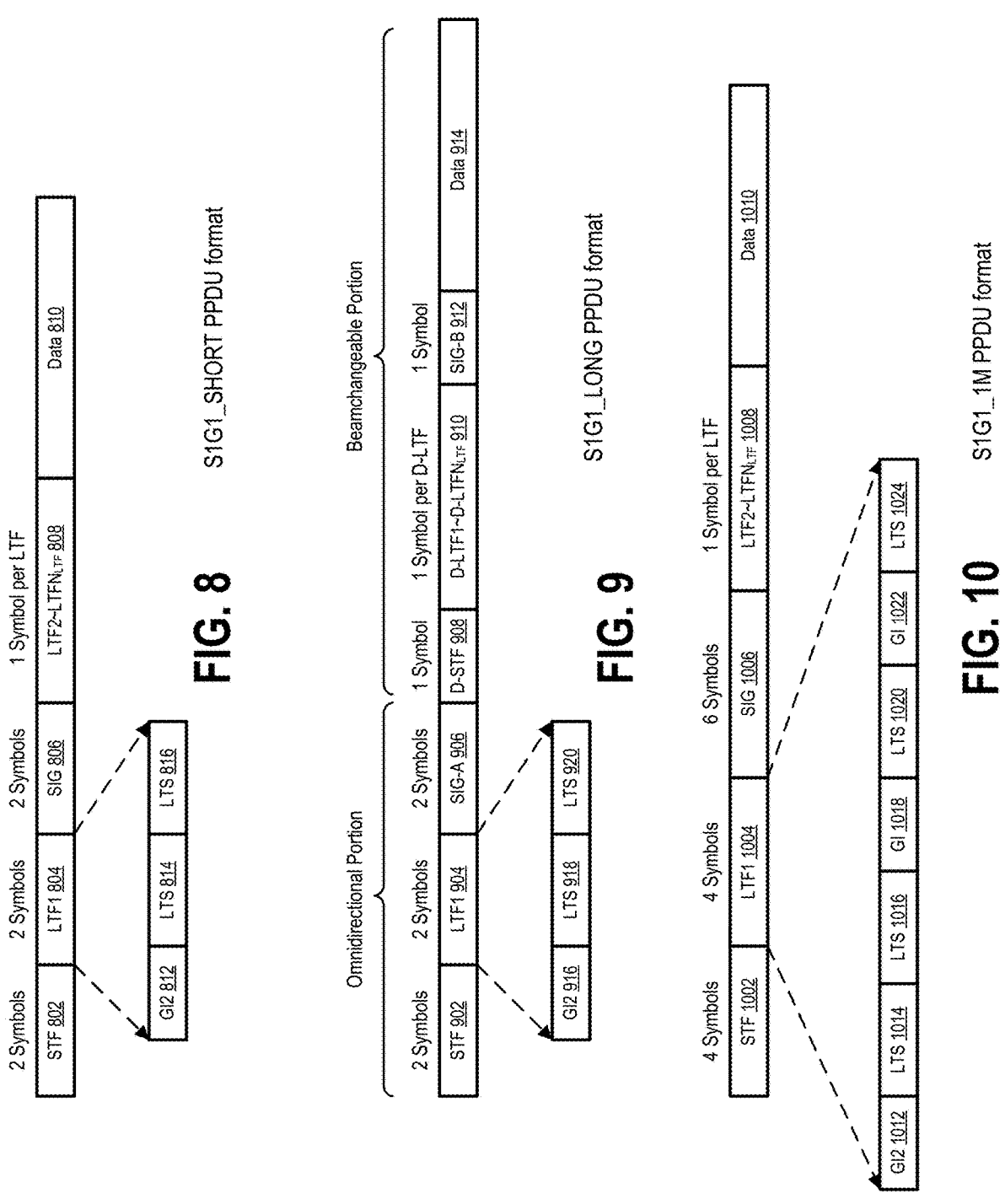
FIG. 8 is a diagram showing a S1G_SHORT physical layer protocol data unit (PPDU) format, according to some embodiments.
FIG. 9 is a diagram showing a S1G_LONG PPDU format, according to some embodiments.
FIG. 10 a diagram showing a S1G_1M PPDU format, according to some embodiments.

When a wake-up signal is transmitted, legacy stations (e.g., wireless devices that do not have wake-up receiver functionality) should defer their transmissions to allow wake-up receivers to receive the wake-up signal correctly. To this end, it is desirable that the legacy stations be able to recognize when a wake-up signal is being transmitted. In an embodiment, to allow legacy stations to recognize when a wake-up signal is being transmitted, a wake-up signal that is based on the legacy IEEE 802.11ah PPDU format can be used. FIGS. 8-10 show various PPDU formats in IEEE 802.11ah including a S1G_SHORT PPDU format, S1G_LONG PPDU format, and S1G_1M PPDU format. Various features and formats are described herein in the context of IEEE 802.11 standards using terminology of IEEE 802.11 standards. Certain details (e.g., the details of certain fields/subfields and their purpose) are omitted herein for sake of conciseness and to avoid obscuring the description.

FIG. 8 is a diagram showing a S1G_SHORT PPDU format, according to some embodiments. As shown in the diagram, the S1G_SHORT PPDU format includes a STF field 802 (2 symbols), a LTF1 field 804 (2 symbols), a SIG field 806 (2 symbols), LTF2~LTFN$_{LTF}$ fields 808 (1 symbol per LTF), and a data field 810. The LTF1 field 804 includes a GI2 field 812, a LTS field 814, and a LTS field 816.

FIG. 9 is a diagram showing a S1G_LONG PPDU format, according to some embodiments. As shown in the diagram, the S1G_LONG PPDU format includes a STF field 902 (2 symbols), a LTF1 field 904 (2 symbols), a SIG-A field 906 (2 symbols), a D-STF field 908, D-LTF1~D-LTFN$_{LTF}$ fields 910 (1 symbol per D-LTF), a SIG-B field 912 (1 symbol), and a data field 914. The LTF1 field 904 includes a GI2 field 916, a LTS field 918, and a LTS field 920. The STF field 902, LTF1 field 904, and SIG-A field 906 may form the omni-directional portion while the D-STF field 908, D-LTF~D-LTFN$_{LTF}$ fields 910, SIG-B field 912, and data field 914 may form the beamchangeable portion.

FIG. 10 a diagram showing a S1G_1M PPDU format, according to some embodiments. As shown in the diagram, the S1G_1M format includes a STF field 1002 (4 symbols), a LTF1 field 1004 (4 symbols), a SIG field 1006 (6 symbols), LTF2~LTFN$_{LTF}$ fields 1008 (1 symbol per LTF), and a data field 1010. The LTF1 field 1004 includes a GI2 field 1012, a LTS field 1014, a LTS field 1016, a GI field 1018, a LTS field 1020, a GI field 1022, and a LTS field 1024.

Figures 11, 12, 13, 14:
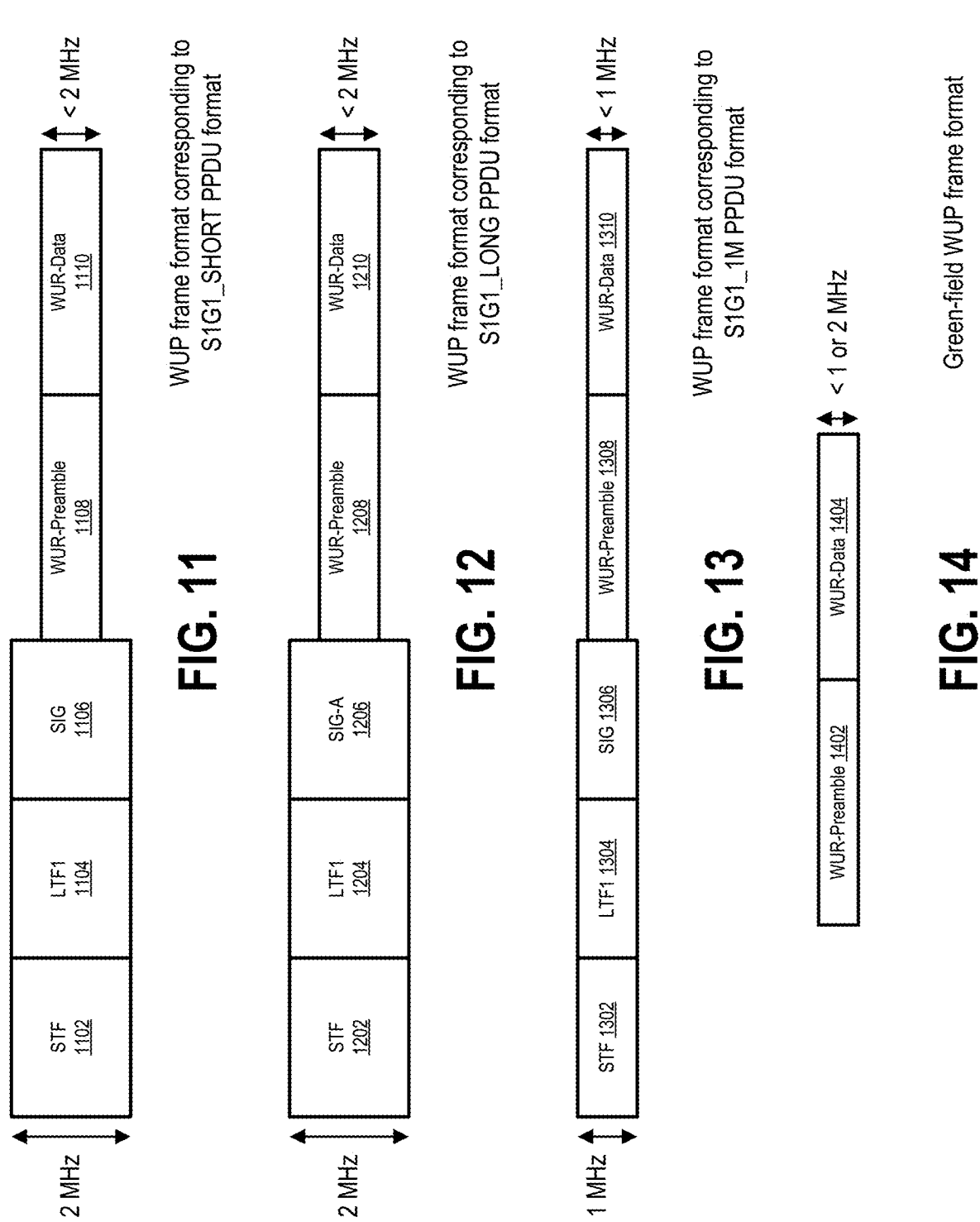
FIG. 11 is a diagram showing a wake-up packet frame format corresponding to S1G_SHORT format, according to some embodiments.
FIG. 12 is a diagram showing a wake-up packet frame format corresponding to S1G-LONG format, according to some embodiments.
FIG. 13 is a diagram showing a wake-up packet frame format corresponding to S1G_1M format, according to some embodiments.
FIG. 14 is a diagram showing a green-field wake-up packet (WUP) frame format, according to some embodiments.

The data transmission scheme for wake-up receiver should be backwards compatible with existing IEEE 802.11ah systems. Backwards compatibility can be achieved by using a legacy preamble as part of the data transmission. In an embodiment, a WUP has the same/similar preamble as a legacy IEEE 802.11ah frame. FIGS. 11-13 show example WUP frame formats corresponding to S1G_SHORT, S1G_LONG, and S1G_1M, respectively.

FIG. 11 is a diagram showing a WUP frame format corresponding to S1G_SHORT format, according to some embodiments. As shown in the diagram, the WUP frame format includes a STF field 1102, a LTF1 field 1104, a SIG field 1106, a wake-up receiver preamble portion 1108, and a wake-up receiver data portion 1110. In an embodiment, the STF field 1102, the LTF1 field 1104, and the SIG field 1106 (the legacy preamble portion of the WUP) are transmitted using a first bandwidth (e.g., ~2 MHz), while the wake-up receiver preamble portion 1108 and the wake-up receiver data portion 1110 (the data portion of the WUP) are transmitted using a second bandwidth that is less than the first bandwidth (e.g., less than 2 MHz). In an embodiment, the wake-up receiver preamble portion 1108 and the wake-up receiver data portion 1110 are transmitted using an OOK modulation scheme immediately following transmission of the SIG field 1106.

FIG. 12 is a diagram showing a WUP frame format corresponding to S1G_LONG format, according to some embodiments. As shown in the diagram, the WUP frame format includes a STF field 1202, a LTF1 field 1204, a SIG-A field 1206, a wake-up receiver preamble portion 1208, and a wake-up receiver data portion 1210. In an embodiment, the STF field 1202, the LTF1 field 1204, and the SIG field 1206 (the legacy preamble portion of the WUP) are transmitted using a first bandwidth (e.g., ~2 MHz), while the wake-up receiver preamble portion 1208 and the wake-up receiver data portion 1210 (the data portion of the WUP) are transmitted using a second bandwidth that is less than the first bandwidth (e.g., less than 2 MHz). In an embodiment, the wake-up receiver preamble portion 1208 and the wake-up receiver data portion 1210 are transmitted using an OOK modulation scheme immediately following transmission of the SIG-A field 1206.

FIG. 13 is a diagram showing a WUP frame format corresponding to S1G_1M format, according to some embodiments. As shown in the diagram, the WUP frame format includes a STF field 1302, a LTF1 field 1304, a SIG field 1306, a wake-up receiver preamble portion 1308, and a wake-up receiver data portion 1310. In an embodiment, the STF field 1302, the LTF1 field 1304, and the SIG field 1306 (the legacy preamble portion of the WUP) are transmitted using a first bandwidth (e.g., ~1 MHz), while the wake-up receiver preamble portion 1308 and the wake-up receiver data portion 1310 (the data portion of the PPDU) are transmitted using a second bandwidth that is less than the first bandwidth (e.g., less than 1 MHz). In an embodiment, the wake-up receiver preamble portion 1308 and the wake-up receiver data portion 1310 are transmitted using an OOK modulation scheme immediately following transmission of the SIG field 1306.

FIG. 14 is a diagram showing a green-field WUP frame format, according to some embodiments. As shown in the diagram, the green-field WUP frame format includes a wake-up receiver preamble portion 1402 and a wake-up receiver data portion 1404. In contrast to the WUP frame formats shown in FIGS. 11-13, the green-field WUP frame format does not include the STF, LTF1, and SIG (SIG-A) fields (there is no legacy preamble portion). In an embodiment, the wake-up receiver preamble portion 1402 and the wake-up receiver data portion 1404 are transmitted using an OOK modulation scheme.

WUP frame formats with the legacy preamble or similar preamble such as the frame formats shown in FIGS. 11-13 may be referred to herein as "mixed-mode" formats. A WUP frame format without the legacy preamble such as the format shown in FIG. 14 may be referred to herein as a "green-field" format.

If a mixed-mode format is used, a wake-up receiver station (which includes both a main radio and a wake-up receiver) and IEEE 802.11ah legacy stations (that do not have wake-up receiver functionality) can coexist according to the following normal operation scenario. The operation of the station receiving the WUP may depend on the type and current operation mode of the station.

For a legacy station that does not support wake-up receiver functionality, if the legacy station successfully decodes the legacy preamble portion of the WUP including the STF field, LTF field, and SIG field (or SIG-A field) (e.g., the check of the CRC in the SIG field or SIG-A field is valid), then the legacy station maintains the PHY-CCA busy state for the predicted transmission duration of the PPDU (e.g., as defined by RXTIME calculated based on SIG or SIG-A information in the IEEE 802.11ah standard).

A wake-up receiver station (a station that supports wake-up receiver functionality) that is in the active mode (e.g., the IEEE 802.11ah main radio is turned on, as shown in the right side of FIG. 7) can also decode the legacy portion of the WUP. The wake-up receiver station that is in the active mode can also decode the wake-up receiver preamble/data of the wake-up packet frame.

A wake-up receiver station that is in the sleep mode (e.g., only the wake-up receiver is turned on, as shown in the left side of FIG. 7) may only be able to decode the wake-up receiver preamble/data (and not the legacy portion of the WUP) because its main radio is turned off. Depending on the information included in the wake-up receiver data of the WUP, the wake-up receiver station may transition from being in the sleep mode to being in the active mode (e.g., by waking up the main radio).

If the legacy station cannot decode the legacy part of the mixed-mode frame format, the legacy station may not sense the wake-up receiver preamble/data of the WUP because the transmission power is too low. This means that the transmission of the WUP is not guaranteed because the legacy station (which cannot sense the wake-up receiver preamble/data) might transmit its packet and it may interfere with the WUP. To avoid such a problem, embodiments provide a RAW mechanism that allocates a certain period of time for a group of wake-up receiver stations (e.g., which could include a single wake-up receiver station or multiple wake-up receiver stations) to prepare the group of wake-up receiver stations to receive a WUP and so that the WUP can be transmitted without interruption from legacy stations. In conventional RAW mechanism in IEEE 802.11ah, uplink channel access is restricted to a small number of stations and their uplink access attempts are spread over a time period. An AP may allocate a medium access interval (e.g., a RAW) for a group of stations within a (short) beacon interval and broadcast this information using an IEEE 802.11ah beacon frame. An example of RAW operations in IEEE 802.11 ah is shown in FIG. 15.

Figure 15:
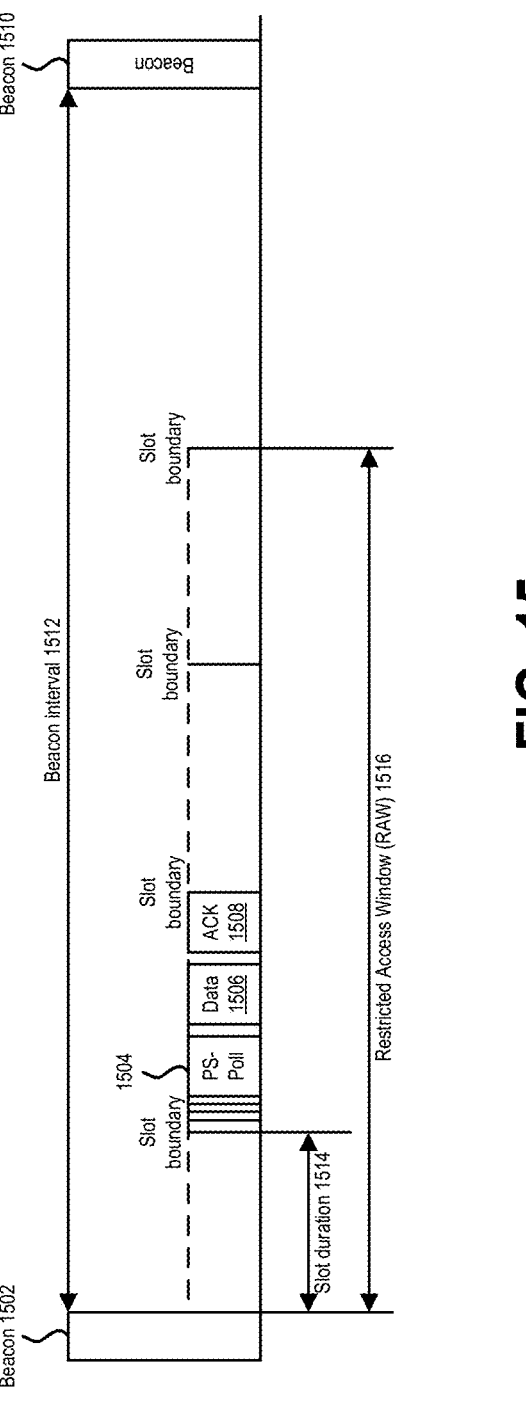
FIG. 15 is a diagram showing example operations for allocating a restricted access window (RAW) in IEEE 802.11ah, according to some embodiments.

FIG. 15 is a diagram showing example operations for allocating a RAW in IEEE 802.11ah, according to some embodiments.

As shown in the diagram, an AP may transmit a beacon frame 1502 to allocate a RAW 1516. The RAW may be divided into multiple slots (the beginning and end of each slot may be called slot boundaries). Each slot may have a slot duration 1514. During a slot, the AP may transmit a PS-Poll (power save polling) frame 1504, a STA may transmit a data frame 1506, and the AP may transmit an acknowledgement frame 1508. The AP may transmit another beacon frame 1510 after a beacon interval 1512 has elapsed since the transmission of the previous beacon frame 1502.

According to some embodiments, an AP may transmit a beacon frame that includes a RAW parameter set (RPS) element to allocate a RAW for wake-up receiver stations. The RPS element may include RAW group information that indicates the AIDs associated with a group of wake-up receiver stations and RAW slot information that indicates the RAW timing. Then, when a wake-up receiver station receives the beacon frame, the wake-up receiver station can identify the time period (i.e., the RAW) of when the wake-up receiver station should prepare to receive a WUP from the AP. During this RAW, the legacy stations may not be allowed to access the channel, according to the RAW operation rules (e.g., as defined by IEEE 802.11ah). In such a case, the WUP may be transmitted using a green-field format to reduce the power consumption of the wake-up receiver stations. Because the legacy stations are not allowed to access the channel during the RAW period, the protection of the WUP is guaranteed even without having the legacy preamble. Additionally, during RAWs allocated for other groups of stations (e.g., legacy stations), the wake-up receiver stations may be in the deep sleep mode in which the wake-up receiver stations turn off both the main radio (IEEE 802.11ah radio) and the wake-up receiver. In an embodiment, a wake-up receiver can operate in at least three different operation modes, including active mode, normal sleep mode, and deep sleep mode.

The active mode may be a mode in which the wake-up receiver station has its main radio functionality (e.g., IEEE 802.11ah receiver functionality) turned on. Depending on the implementation/condition, the wake-up receiver functionality may also be turned on in this mode.

Sleep mode may be a mode in which the wake-up receiver station has its wake-up receiver functionality turned on but its main radio functionality is turned off.

Deep sleep mode may be a mode in which the wake-up receiver station has both of its main radio functionality and wake-up receiver functionality turned off.

Figure 16:
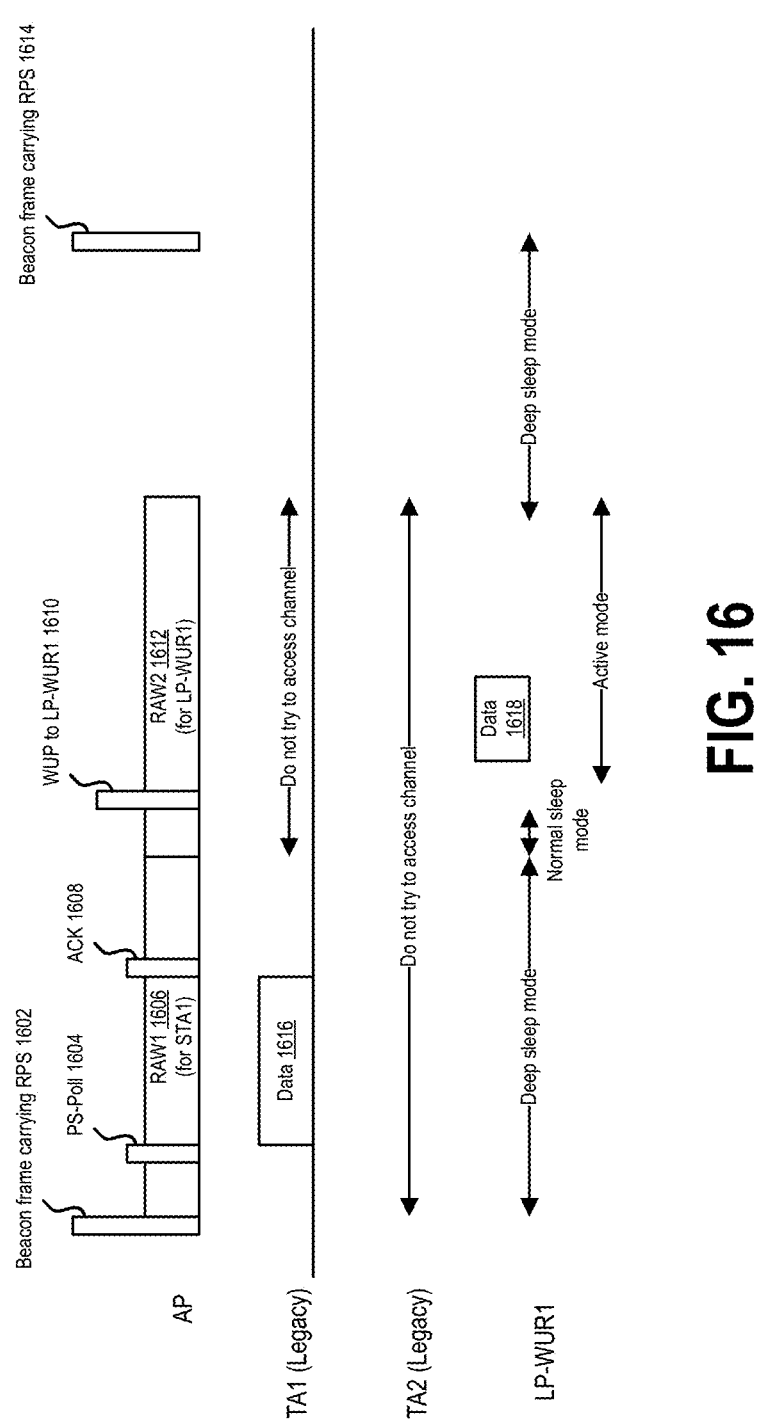
FIG. 16 is a diagram showing example operations for allocating a RAW for wake-up receiver stations, according to some embodiments.

FIG. 16 is a diagram showing example operations for allocating a RAW for wake-up receiver stations, according to some embodiments.

As shown in the diagram, AP transmits a beacon frame 1602 that includes information regarding a first RAW (RAW1 1606) and information regarding a second RAW (RAW2 1612). The information regarding RAW1 1606 may include information regarding the timing of RAW1 1606 (e.g., when RAW1 1606 begins and the duration of RAW 1606) and indicate the AID corresponding to STA1 (which is a legacy station in this example). The information regarding RAW2 1612 may include information regarding the timing of RAW2 1612 and indicate the AIDs corresponding to one or more wake-up receiver stations. Thus, RAW1 is allocated for STA1 and RAW2 is allocated for the one or more wake-up receiver stations. During RAW1 1606, STA1 (a legacy station) may transmit a data frame 1616 and the AP may transmit an acknowledgement frame 1608. The other STAs (e.g., STA2 (another legacy station) and LP-WUR1 (a wake-up receiver station)) defer their channel access. LP-WUR1 may be in a deep sleep mode during RAW1 1606 because there is no possibility of transmitting or receiving traffic. At the beginning of RAW2 1612, LP-WUR1 may transition from being in the deep sleep mode to being in the normal sleep mode. That is, LP-WUR1 may activate its wake-up receiver functionality (turn on its wake-up receiver) to prepare for the reception of a WUP. If the AP transmits a WUP 1610 to LP-WUR1 (which can be transmitted using the mixed-mode format or a green-field format), LP-WUR1 may receive and decode this WUP 1610 (since its wake-up receiver functionality is turned on) and transition from being in the normal sleep mode to being in the active mode (e.g., by activating its main radio (IEEE 802.11ah receiver) functionality). In the active mode, LP-WUR1 may transmit and/or receive a data frame 1618 (IEEE 802.11ah) via its main radio. During RAW2 1612, legacy stations (e.g., STA1 and STA2) do not attempt to access the channel. At the end of RAW2, LP-WUR1 may transition from being in the active mode to being in the deep sleep mode because there is no possibility of receiving a WUP.

The IEEE 802.11ah standard defines two types of beacon frames. The first type is a normal beacon frame and the second type is a short beacon frame. Multiple short beacon frames can be transmitted between two normal beacon frames. In an embodiment, to further reduce the power consumption of wake-up receiver stations, a RPS element for allocating a RAW for wake-up receiver stations is only carried by normal beacon frames. This allows for extending the amount of time that wake-up receivers can be in the deep sleep mode and allows wake-up receiver stations to save more power. In an embodiment, a normal beacon frame includes information regarding the interval with which beacon frames carrying a RPS element for allocating a RAW for wake-up receiver stations will be transmitted.

In an embodiment, a specific RPS element can be carried in a beacon frame to convey information regarding a RAW that is being allocated for wake-up receiver stations. An example RPS element format is shown in FIG. 17.

Figure 17:
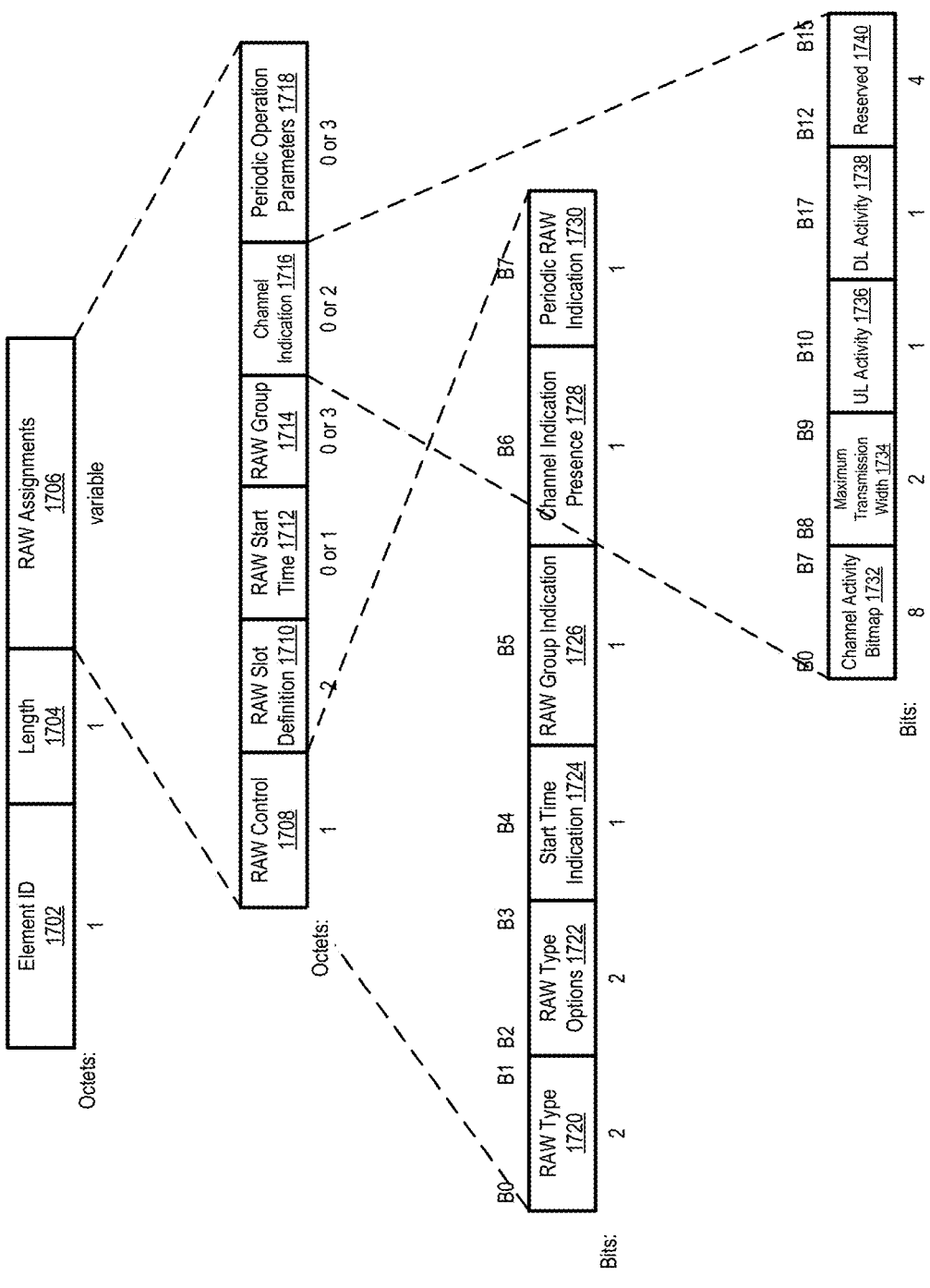
FIG. 17 is a diagram showing a RAW parameter set (RPS) element format in IEEE 802.11ah, according to some embodiments.

FIG. 17 is a diagram showing a RPS element format in IEEE 802.11ah, according to some embodiments. As shown in the diagram, the RPS element format includes an element ID field 1702 (1 octet), a length field 1704 (1 octet), and a RAW assignments field 1706 (variable length). The RAW assignments field 1706 includes a RAW control field 1708 (1 octet), a RAW slots definition field 1710 (2 octets), a RAW start time field 1712 (0 or 1 octet), a RAW group field 1714 (0 or 3 octets), a channel indication field 1716 (0 or 2 octets), and a periodic operation parameters field 1718 (0 or 3 octets). The RAW control field 1708 includes a RAW type field 1720 (2 bits), a RAW type options field 1722 (2 bits), a start time indication field 1724 (1 bit), a RAW group indication field 1726 (1 bit), a channel indication presence field 1728 (1 bit), and a periodic RAW indication field 1730 (1 bit). The channel indication field 1716 may include a channel activity bitmap field 1732 (8 bits), a maximum transmission width field 1734 (2 bits), a UL activity field 1736 (1 bit), a DL activity field 1738 (1 bit), and a reserved field 1740 (4 bits).

In this diagram bit positions are represented as Bn, where n is a number representing the position.

In an embodiment, the RAW type field 1720 and RAW type options field 1722 are interpreted according to the table shown in FIG. 18.

FIG. 18 is a diagram showing a table of an interpretation of the RAW type field and the RAW type options field in IEEE 802.11ah, according to some embodiments. As shown in the table, a RAW type value of "0" indicates generic RAW, a RAW type value of "1" indicates sounding RAW, a RAW type value of "2" indicates simplex RAW, and a RAW type value of "3" indicates triggering frame RAW. When the RAW type value is "0" (generic RAW), bit 0 of the RAW type options field indicates paged STA and bit 1 of the RAW type options field indicates RA (resource allocation) frame. When the RAW type value is "1" (sounding RAW), a RAW type options value of "0" indicates a SST (subchannel selective transmission) sounding RAW, a RAW type options value of "1" indicates a SST report RAW, a RAW type options value of "2" indicates a sector sounding RAW, and a RAW type options value of "3" indicates a sector report RAW. When the RAW type value is "2" (simplex RAW), a RAW type options value of "0" indicates an AP PM (access point power management) RAW, a RAW type options value of "1" indicates a non-TIM (traffic indication map) RAW, a RAW type options value of "2" indicates an omni RAW, and a RAW type options value of "3" is reserved. When the RAW type value is "3" (triggering frame RAW), the RAW type options field is reserved.

In an embodiment, a RAW for wake-up receiver stations can be indicated as follows. The RAW type value is set to "0" (e.g., generic RAW) and bit 0 and bit 1 of the RAW type options field are set to "0" and "1", respectively, to indicate for the AP to transmit a resource allocation (RA) frame to a paged wake-up receiver station. For the RAW allocated for the group of wake-up receiver stations, a WUP may be transmitted instead of a RA frame to wake up the specified (paged) wake-up receiver station.

In another embodiment, a RAW for wake-up receiver stations can be indicated as follows. The RAW type value is set to "2" (e.g., simplex RAW) and the RAW type options value is set to "3" to indicate for the AP to transmit a WUP to wake up a wake-up receiver station. While particular values for the RAW type field and RAW type options field are mentioned above, it should be appreciated that other values can be used to indicate a RAW that is being allocated for wake-up receiver stations.

The present disclosure describes a way to allocate a RAW for wake-up receiver stations. In an embodiment, a periodic RAW (PRAW) scheme is used. With the PRAW scheme, an AP may schedule a RAW in a periodic manner. The AP may allocate the PRAW by broadcasting information regarding the PRAW such that every TIM (traffic indication map) STA can identify the allocation of the PRAW. However, it is not necessary for the AP to indicate the PRAW allocation in every beacon frame transmitted in the beacon interval or short beacon interval, for which PRAW is allocated. In an embodiment, stations can assume that the parameters in the RAW assignments field for PRAW shall not be changed until updated PRAW information is broadcasted.

A technical advantage of embodiments disclosed herein is that power consumption of the wake-up receiver stations can be significantly reduced and thus the network operation time can be extended. The RAW operations disclosed herein allow for a WUP to be transmitted using a green-field format to wake up wake-up receiver stations and also allow for the use of a two-stage sleep mode operation (normal sleep mode and deep sleep mode) to reduce power consumption compared to conventional wake-up receiver operations.

Turning now to FIG. 19, a method 1900 will now be described for allocating a RAW for wake-up receiver stations, in accordance with some embodiments. The method 1900 may be performed by one or more devices described herein. For example, the method 1900 may be performed by a wireless device 104 functioning as an AP in a wireless network.

Although shown in a particular order, in some embodiments the operations of the method 1900 (and the other method(s) shown in the other figure(s)) may be performed in a different order. For example, although the operations of the method 1900 are shown in a sequential order, some of the operations may be performed in partially or entirely overlapping time periods.

As shown in FIG. 19, the method 1900 may commence at operation 1902 with the AP generating a beacon frame, wherein the beacon frame includes information regarding a RAW that is allocated for one or more wake-up receiver stations, wherein each of the one or more wake-up receiver stations includes a main radio and a wake-up receiver. In an embodiment, the information regarding the RAW includes one or more AIDs corresponding to the one or more wake-up receiver stations. In an embodiment, the information regarding the RAW includes information regarding a timing of the RAW (e.g., when the RAW begins).

At operation 1904, the AP wirelessly transmits the beacon frame. In an embodiment, the wireless transmission of the beacon frame causes a wake-up receiver station from the one or more wake-up receiver stations to transition from being in a deep sleep mode to being in a normal sleep mode when the RAW begins, wherein when the wake-up receiver station is in the deep sleep mode, both a main radio of the wake-up receiver station and a wake-up receiver of the wake-up receiver station are turned off, wherein when the wake-up receiver station is in the normal sleep mode, the main radio of the wake-up receiver station is turned off but the wake-up receiver of the wake-up receiver station is turned on.

In an embodiment, the beacon frame includes a RPS (RAW parameter set) element that includes a raw-type field and a raw-type options field, wherein a value of the raw-type field is set to binary '00' and a value of the raw-type options field is set to binary '01' to indicate that the RAW is allocated for wake-up receiver stations. In an embodiment, the beacon frame includes a RPS element that includes a raw-type field and a raw-type options field, wherein a value of the raw-type field is set to binary '10' and a value of the raw-type options field is set to binary '11' to indicate that the RAW is allocated for wake-up receiver stations.

At operation 1906, the AP wirelessly transmits a wake-up packet to a wake-up receiver station during the RAW. In an embodiment, the wireless transmission of the wake-up packet causes the wake-up receiver station to transition from being in the normal sleep mode to being in an active mode, wherein when the wake-up receiver station is in the active mode the main radio of the wake-up receiver station is turned on. In an embodiment, the wake-up packet is wirelessly transmitted using a green-field format (without a legacy preamble).

In an embodiment, the wake-up packet is wirelessly transmitted using a mixed-mode format that includes a legacy preamble portion and a data portion, wherein the legacy preamble portion is decodable by stations that are not wake-up receiver stations and the data portion is decodable by wake-up receiver stations. In an embodiment, the legacy preamble portion is wirelessly transmitted using a first bandwidth and the data portion is wirelessly transmitted using a second bandwidth that is lower than the first bandwidth. In an embodiment, the data portion includes a wake-up receiver preamble portion and a wake-up receiver data portion. In an embodiment, the data portion is wirelessly transmitted using an OOK modulation scheme. In an embodiment, the wake-up packet is wirelessly transmitted in a sub-1 Gigahertz (GHz) band.

At operation 1908, the AP wirelessly transmits a data frame to the wake-up receiver stations during the RAW after wirelessly transmitting the wake-up packet to the wake-up receiver station.

In an embodiment, the beacon frame further includes information regarding an interval with which the access point will wirelessly transmit future beacon frames that include information regarding RAWs that are allocated for wake-up receiver stations.

In an embodiment, the wireless transmission of the beacon frame further causes stations that are not wake-up receiver stations to avoid wireless transmissions during the RAW. In an embodiment, the beacon frame further includes information regarding another RAW that is allocated for one or more stations that are not wake-up receiver stations, wherein the wireless transmission of the beacon frame causes a wake-up receiver station to be in a deep sleep mode during the another RAW.

In an embodiment, the beacon frame further includes information regarding an interval with which RAWs that are allocated for wake-up receiver stations occurs (e.g., periodic RAWs).

Turning now to FIG. 20, a method 2000 will now be described for performing RAW operations, in accordance with some embodiments. The method 2000 may be performed by one or more devices described herein. For example, the method 2000 may be performed by a wireless device 104 functioning as a wake-up receiver station in a wireless network. The wake-up receiver station includes a main radio and a wake-up receiver.

As shown in FIG. 20, the method 2000 may commence at operation 2002 with the wake-up receiver station wirelessly receiving, via the main radio, a beacon frame from an access point, wherein the beacon frame includes information regarding a RAW that is allocated for one or more wake-up receiver stations forming a RAW group of the RAW. In an embodiment, the wireless transmission of the beacon frame by the access point causes stations that are not wake-up receiver stations to avoid wireless transmissions during the RAW.

At operation 2004, responsive to determining that the wake-up receiver station is part of the RAW group, the wake-up receiver station transitions from being in a deep sleep mode to being in a normal sleep mode when the RAW begins, wherein when the wake-up receiver station is in the deep sleep mode, both the main radio and the wake-up receiver are turned off, wherein when the wake-up receiver station is in the normal sleep mode, the main radio is turned off but the wake-up receiver is turned on. In an embodiment, the information regarding the RAW includes one or more AIDs corresponding to one or more wake-up receiver stations, wherein the determination that the wake-up receiver station is part of the RAW group is based on a determination that an AID corresponding to the wake-up receiver station is included in the one or more AIDs.

At operation 2006, the wake-up receiver station wirelessly receives, via the wake-up receiver, a wake-up packet from the access point during the RAW. In an embodiment, the wake-up packet is wirelessly transmitted by the access point using a green-field format (without a legacy preamble).

At operation 2008, responsive to wirelessly receiving the wake-up packet, the wake-up receiver station transitions from being in the normal sleep mode to being in an active mode, wherein when the wake-up receiver station is in the active mode, the main radio is turned on.

At operation 2010, the wake-up receiver station wirelessly receives, via the main radio, a data frame from the access point during the RAW after wirelessly receiving the wake-up packet from the access point.

In an embodiment, the beacon frame further includes information regarding another RAW that is allocated for one or more stations that are not wake-up receiver stations, wherein the wake-up receiver station is to be in the deep sleep mode during the another RAW.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method performed by a wireless device operating as an access point in a wireless network to allocate a restricted access window (RAW) for wake-up receiver stations, the method comprising:

generating a beacon frame, wherein the beacon frame includes information regarding a RAW that is allocated for one or more wake-up receiver stations, wherein each of the one or more wake-up receiver stations includes a main radio and a wake-up receiver;

wirelessly transmitting the beacon frame, wherein the wireless transmission of the beacon frame causes a wake-up receiver station from the one or more wake-up receiver stations to transition from being in a deep sleep mode to being in a normal sleep mode when the RAW begins, wherein when the wake-up receiver station is in the deep sleep mode, both a main radio of the wake-up receiver station and a wake-up receiver of the wake-up receiver station are turned off, wherein when the wake-up receiver station is in the normal sleep mode, the main radio of the wake-up receiver station is turned off but the wake-up receiver of the wake-up receiver station is turned on; and wirelessly transmitting a wake-up packet to the wake-up receiver station during the RAW, wherein the wireless transmission of the wake-up packet causes the wake-up receiver station to transition from being in the normal sleep mode to being in an active mode, wherein when the wake-up receiver station is in the active mode the main radio of the wake-up receiver station is turned on.

2. The method of claim 1, wherein the wake-up packet is wirelessly transmitted using a green-field format.

3. The method of claim 1, further comprising:

wirelessly transmitting a data frame to the wake-up receiver station during the RAW after wirelessly transmitting the wake-up packet to the wake-up receiver station.

4. The method of claim 1, wherein the wake-up packet is wirelessly transmitted using a mixed-mode format that includes a legacy preamble portion and a data portion, wherein the legacy preamble portion is decodable by stations that are not wake-up receiver stations and the data portion is decodable by wake-up receiver stations.

5. The method of claim 4, wherein the legacy preamble portion is wirelessly transmitted using a first bandwidth and the data portion is wirelessly transmitted using a second bandwidth that is lower than the first bandwidth.

6. The method of claim 5, wherein the data portion includes a wake-up receiver preamble portion and a wake-up receiver data portion.

7. The method of claim 6, wherein the data portion is wirelessly transmitted using an on-off keying (OOK) modulation scheme.

8. The method of claim 4, wherein the wake-up packet is wirelessly transmitted in a sub-1 Gigahertz (GHz) band.

9. The method of claim 1, wherein the beacon frame further includes information regarding another RAW that is allocated for one or more stations that are not wake-up receiver stations, wherein the wireless transmission of the beacon frame causes a wake-up receiver station to be in a deep sleep mode during the another RAW.

10. The method of claim 9, wherein the wireless transmission of the beacon frame further causes stations that are not wake-up receiver stations to avoid wireless transmissions during the RAW.

11. The method of claim 1, wherein the information regarding the RAW includes one or more association identifiers (AIDs) corresponding to the one or more wake-up receiver stations.

12. The method of claim 1, wherein the information regarding the RAW includes information regarding a timing of the RAW.

13. The method of claim 1, wherein the beacon frame further includes information regarding an interval with which the access point will wirelessly transmit future beacon frames that include information regarding RAWs that are allocated for wake-up receiver stations.

14. The method of claim 1, wherein the beacon frame includes a RAW parameter set (RPS) element that includes a raw-type field and a raw-type options field, wherein a value of the raw-type field is set to binary '00' and a value of the raw-type options field is set to binary '01' to indicate that the RAW is allocated for wake-up receiver stations.

15. The method of claim 1, wherein the beacon frame includes a RAW parameter set (RPS) element that includes a raw-type field and a raw-type options field, wherein a value of the raw-type field is set to binary '10' and a value of the raw-type options field is set to binary '11' to indicate that the RAW is allocated for wake-up receiver stations.

16. The method of claim 1, wherein the beacon frame further includes information regarding an interval with which RAWs that are allocated for wake-up receiver stations occurs.

17. A wireless device that is to operate as an access point in a wireless network, the wireless device comprising:

a radio frequency transceiver;

a memory device storing a set of instructions; and a processor coupled to the memory device, wherein the set of instructions when executed by the processor causes the wireless device to:

generate a beacon frame, wherein the beacon frame includes information regarding a RAW that is allocated for one or more wake-up receiver stations, wherein each of the one or more wake-up receiver stations includes a main radio and a wake-up receiver, wirelessly transmit the beacon frame, wherein the wireless transmission of the beacon frame causes a wake-up receiver station from the one or more wake-up receiver stations to transition from being in a deep sleep mode to being in a normal sleep mode when the RAW begins, wherein when the wake-up receiver station is in the deep sleep mode, both a main radio of the wake-up receiver station and a wake-up receiver of the wake-up receiver station are turned off, wherein when the wake-up receiver station is in the normal sleep mode, the main radio of the wake-up receiver station is turned off but the wake-up receiver of the wake-up receiver station is turned on, and wirelessly transmit a wake-up packet to the wake-up receiver station during the RAW, wherein the wireless transmission of the wake-up packet causes the wake-up receiver station to transition from being in the normal sleep mode to being in an active mode, wherein when the wake-up receiver station is in the active mode the main radio of the wake-up receiver station is turned on.

* * * * *